United States Patent
Bergamini et al.

(10) Patent No.: US 10,578,090 B2
(45) Date of Patent: Mar. 3, 2020

(54) SEAL ASSEMBLY FOR A PISTON ROD

(71) Applicant: Nuovo Pignone Tecnologie Srl, Florence (IT)

(72) Inventors: Lorenzo Bergamini, Bari (IT); Alessio Capanni, Florence (IT)

(73) Assignee: Nuovo Pignone Tecnologie SRL, Florence (IT)

( * ) Notice: Subject to any disclaimer, the term of this patent is extended or adjusted under 35 U.S.C. 154(b) by 27 days.

(21) Appl. No.: 15/677,787

(22) Filed: Aug. 15, 2017

(65) Prior Publication Data
US 2018/0051684 A1 Feb. 22, 2018

(30) Foreign Application Priority Data
Aug. 17, 2016 (IT) .................. 102016000085635

(51) Int. Cl.
*F04B 39/04* (2006.01)
*F16J 15/3208* (2016.01)
(Continued)

(52) U.S. Cl.
CPC ............ *F04B 39/041* (2013.01); *F16F 9/365* (2013.01); *F16J 15/3208* (2013.01); *F16J 15/56* (2013.01)

(58) Field of Classification Search
CPC . F04B 39/041; F16F 9/36; F16J 15/183; F16J 15/185; F16J 15/186; F16J 15/406;
(Continued)

(56) References Cited

U.S. PATENT DOCUMENTS 3,752,461 A * 8/1973 Gratzmuller .......... F16F 9/0218
267/113
4,431,199 A * 2/1984 Iwane .................... F16J 15/006
277/349
(Continued)

FOREIGN PATENT DOCUMENTS

GB 1 380 346 A 1/1975
JP 58113660 A * 7/1983 ............. F16J 15/006
(Continued)

OTHER PUBLICATIONS

Search Report and Written Opinion issued in connection with corresponding IT Application No. 102016000085635 dated Mar. 29, 2017.
(Continued)

*Primary Examiner* — Eugene G Byrd
(74) *Attorney, Agent, or Firm* — Baker Hughes Patent Organization

(57) ABSTRACT

A seal assembly for a piston rod including an external seal and an internal seal. The external seal is adapted to be placed on a piston rod facing an external environment, the internal seal is adapted to be placed on the rod facing the cylinder associated to the piston. The external and internal seals define in cooperation with each other a chamber for the containment of barrier fluid. Such chamber has an inlet for the intake of barrier fluid and an outlet for the exit of barrier fluid. The assembly also comprises a recirculation circuit for the barrier fluid, which is placed in fluid communication with the inlet and the outlet to recirculate the barrier fluid from the outlet back to the inlet and a pressurizer device configured to be installed coaxially with the piston rod providing the chamber with a positive pressure with respect to the process environment.

20 Claims, 4 Drawing Sheets

(51) Int. Cl.
*F16J 15/56* (2006.01)
*F16F 9/36* (2006.01)

(58) Field of Classification Search
CPC ......... F16J 15/56; F16K 41/003; F16K 41/02; F16K 41/04
See application file for complete search history.

(56) References Cited

U.S. PATENT DOCUMENTS

| | | | | |
|---|---|---|---|---|
| 6,135,434 | A * | 10/2000 | Marking | F16F 9/062 188/315 |
| 6,161,835 | A * | 12/2000 | Arbuckle | F16J 15/3296 277/320 |
| 6,311,962 | B1 * | 11/2001 | Marking | B60G 15/14 188/322.17 |
| 2009/0272521 | A1 * | 11/2009 | Pecorari | E21B 33/085 166/84.2 |
| 2010/0253007 | A1 * | 10/2010 | Tackett | F04B 15/04 277/513 |
| 2012/0211945 | A1 * | 8/2012 | Lindner-Silwester | F04B 39/0094 277/508 |
| 2015/0017037 | A1 * | 1/2015 | Hocker | F04B 1/0408 417/471 |
| 2015/0086388 | A1 * | 3/2015 | Hold | F04B 39/0207 417/53 |
| 2016/0131131 | A1 * | 5/2016 | Weaver | F04B 53/143 277/300 |
| 2016/0230893 | A1 * | 8/2016 | Ashiba | F16F 9/36 |

FOREIGN PATENT DOCUMENTS

| | | | |
|---|---|---|---|
| JP | H03-3950 A | 1/1991 | |
| JP | 2015061979 A * | 4/2015 | ......... F04B 39/0207 |
| WO | 2013/182456 A1 | 12/2013 | |

OTHER PUBLICATIONS

Extended European Search Report and Opinion issued in connection with corresponding EP Application No. 17184627.2 dated Sep. 28, 2017.

* cited by examiner

SEAL ASSEMBLY FOR A PISTON ROD

BACKGROUND OF THE INVENTION

The subject matter of this disclosure relates to a seal assembly for a piston rod, for example for use in a reciprocating compressor which are normally affected by problems of leaking of the process fluid. Such seal assembly can therefore used to prevent leaks of process fluid which is toxic or harmful to the environment.

Conventional piston rods are normally equipped with sealing assemblies defining a chamber, said sealing assemblies having a process surface, exposed to the process fluid, and an internal surface, which is in contact with the barrier fluid inside said chamber.

As shown by document WO2013182456A1 a sealing assembly can be provided with a return line for a barrier fluid. The return line is connected to an inlet and an outlet of the assembly. A pump is placed onto the return line in order to recirculate the barrier fluid from the outlet back to the inlet.

In some instances, a drawback of the type of seal assembly disclosed in WO2013182456A1, wherein the barrier fluid pressure is predetermined and fixed, is that some barrier fluid may flow into the process fluid, especially during the suction phase of the piston, thus increasing the oil consumption of the compressor and potentially increasing the contamination of the process fluid.

Also, regardless of the process pressure, this design inherently requires a recirculation circuit for the process fluid leaking through the pressure breakers. Furthermore, the barrier fluid leakage towards the process is not recoverable.

BRIEF DESCRIPTION OF THE INVENTION

Given the drawbacks of the prior art, a first embodiment of the subject matter of this disclosure is directed to a new seal assembly for a piston rod. The assembly comprises an external seal adapted to be placed on a piston rod facing an external environment. The assembly also comprises an internal seal adapted to be placed on the rod facing a cylinder. The external and internal seals define in cooperation with each other a chamber for the containment of barrier fluid. Such chamber has an inlet for the intake of barrier fluid and an outlet for the exit of barrier fluid.

The assembly also comprises a recirculation circuit for the barrier fluid, which is placed in fluid communication with the inlet and the outlet in order to recirculate the barrier fluid from the outlet back to the inlet.

A pressurizer device is configured to provide the chamber with a positive pressure with respect to the process environment. The pressurizer device is configured to be installed coaxially with the piston rod.

The pressure of the barrier fluid inside the chamber is higher than the pressure of the process fluid inside the cylinder during both forward and backward strokes of the piston. Also, the pressure inside the chamber is not constant, but rather the pressurizer maintains a constant pressure difference between the barrier fluid in the chamber and the process fluid in the process environment, inside said cylinder.

BRIEF DESCRIPTION OF THE DRAWINGS

These and other features, aspects, and advantages of the subject matter of this disclosure will become better understood when the following detailed description is read with reference to the accompanying drawings in which like characters represent like parts throughout the drawings, wherein.

DETAILED DESCRIPTION OF THE INVENTION

Figure 1:
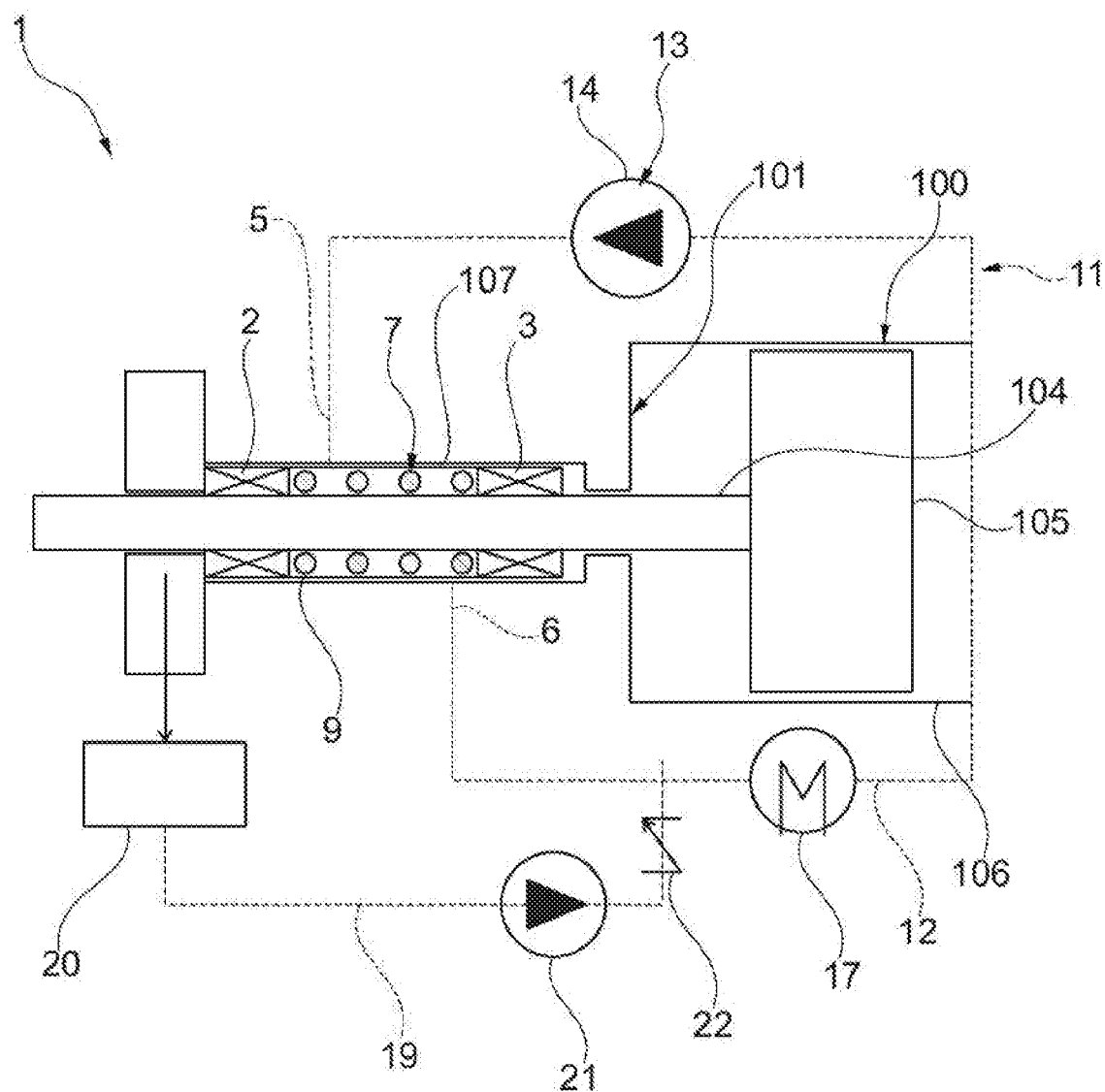
FIG. 1 is a schematic sectional view of a first embodiment of a seal assembly for a piston rod.

The following disclosure describes in detail various embodiments of a seal assembly for a piston rod. A piston is a device that performs an alternating movement inside a cylinder, such as, for example, inside engines of motor vehicles or inside reciprocating compressors. Since the piston works on process fluid that can be potentially hazardous, and since the rod of the piston needs to be free to move back and forth inside the cylinder, there is a need to close the space in which the rod of the piston moves in order to prevent the leakage of the process fluid. This is the purpose of the seal assembly.

With reference to the attached drawings, reference number 1 indicates a seal assembly for a piston rod according to an embodiment.

Said seal assembly 1 is configured to be installed onto a piston assembly 100, which will therefore also be briefly described hereinafter. Said piston assembly 100 comprises a rod 104 attached to a piston 105, which moves inside a cylinder 106. The rod 104 is usually provided in a main cylinder body 101, which usually comprises the casing of said piston 105.

Also, reference is made to a process environment "P" which, during operation, contains or is directly in contact with a process fluid, and an external environment "E" which is typically an environment which should be kept uncontaminated from process fluid. An example of an external environment "E" can be an atmospheric pressure environment where users and operators may be directly exposed to the environment.

The seal assembly 1 comprises a container 107, an internal seal 3, adapted to be placed inside said container 107 and on the rod 104 facing the cylinder 106 and in contact with the process environment "P". Said container 107 can be either adapted to be installed onto a piston assembly 100, for instance for retrofitting an existing machine, or integrated with said piston assembly 100.

More detail about the internal seal 3 will be given in a following part of the present disclosure.

The seal assembly 1 further comprises an external seal 2, which is adapted to be placed inside said container 107 and on the rod 104 facing the external environment "E". Said external seal 2 is placed on the rod 104 farther away from the cylinder 106 with respect to the internal seal 3.

Said external seal 2 and said internal seal 3 define, in cooperation with each other, a chamber 4 for the containment of barrier fluid. The chamber 4 has an inlet 5 for the intake of barrier fluid and an outlet 6 for the exit of barrier fluid. In other words, during normal operation the barrier fluid circulates inside said chamber 4 from the inlet 5 to the outlet 6.

In further detail, the chamber 4 is defined between the rod 104 and the container 107. Therefore, the chamber 4 may have an annular shape and is coaxial with respect to the rod 104 of the piston assembly 100. Moreover it is to be noted that, as shown in the enclosed figures, the chamber 4 has a variable volume. For this reason, the amount of barrier fluid available inside the seal assembly 1 is in direct correlation with the volume of the chamber 4.

Furthermore, the seal assembly 1 optionally comprises a recirculation circuit 11 for the barrier fluid. This recirculation circuit 11 is placed in fluid communication with the inlet 5 and with the outlet 6 of the chamber 4, in order to recirculate the barrier fluid from the outlet 6 back to the inlet 5.

It is to be noted that, in case of reduced thermal load (like for applications with low pressure of the process gas), heat dissipation by the barrier fluid through conduction may be sufficient for cooling purposes. In this case the recirculation circuit 11 is not required, and may be omitted.

In greater detail, the recirculation circuit 11 comprises a return line 12 in fluid communication with the inlet 5 and the outlet 6. Indeed, the return line 12 carries the barrier fluid from the outlet 6 back to the inlet 5. A heat exchanger 17 is placed along the return line, in order to cool the barrier fluid exiting the chamber 4. This way the barrier fluid can also perform the function of cooling the rod 104 of the piston assembly 100.

In order to recover the barrier fluid leaking out from the external seal 2, the assembly 1 comprises a collector 20, placed coaxially to the rod 104 on the side of the external seal 2 opposite to the chamber 4. A scraper ring 18 is placed inside the collector 20, as shown for example in FIG. 2.

The recirculation circuit 11 also may comprise a drain line 19, which is placed in fluid communication with the collector 20 and with the return line 12, in particular upstream of the heat exchanger 17. Therefore, the barrier fluid which is collected from the rod 104 by the scraper ring 18 flows into the drain line 19 and back into the return line 12. With additional detail, the recirculation circuit comprises a makeup pump 21 placed on the drain line 19 downstream of the collector 20. A further check valve 22 is placed downstream of the makeup pump 21, ensuring that the barrier fluid is prevented from flowing from the return line 12 into the drain line 19.

The recirculation circuit 11 may also comprise a backflow prevention device 13 placed on the return line 12 to prevent the barrier fluid to flow on the return line 12 back from the inlet 5 to the outlet 6 of the chamber 4.

Figure 4:
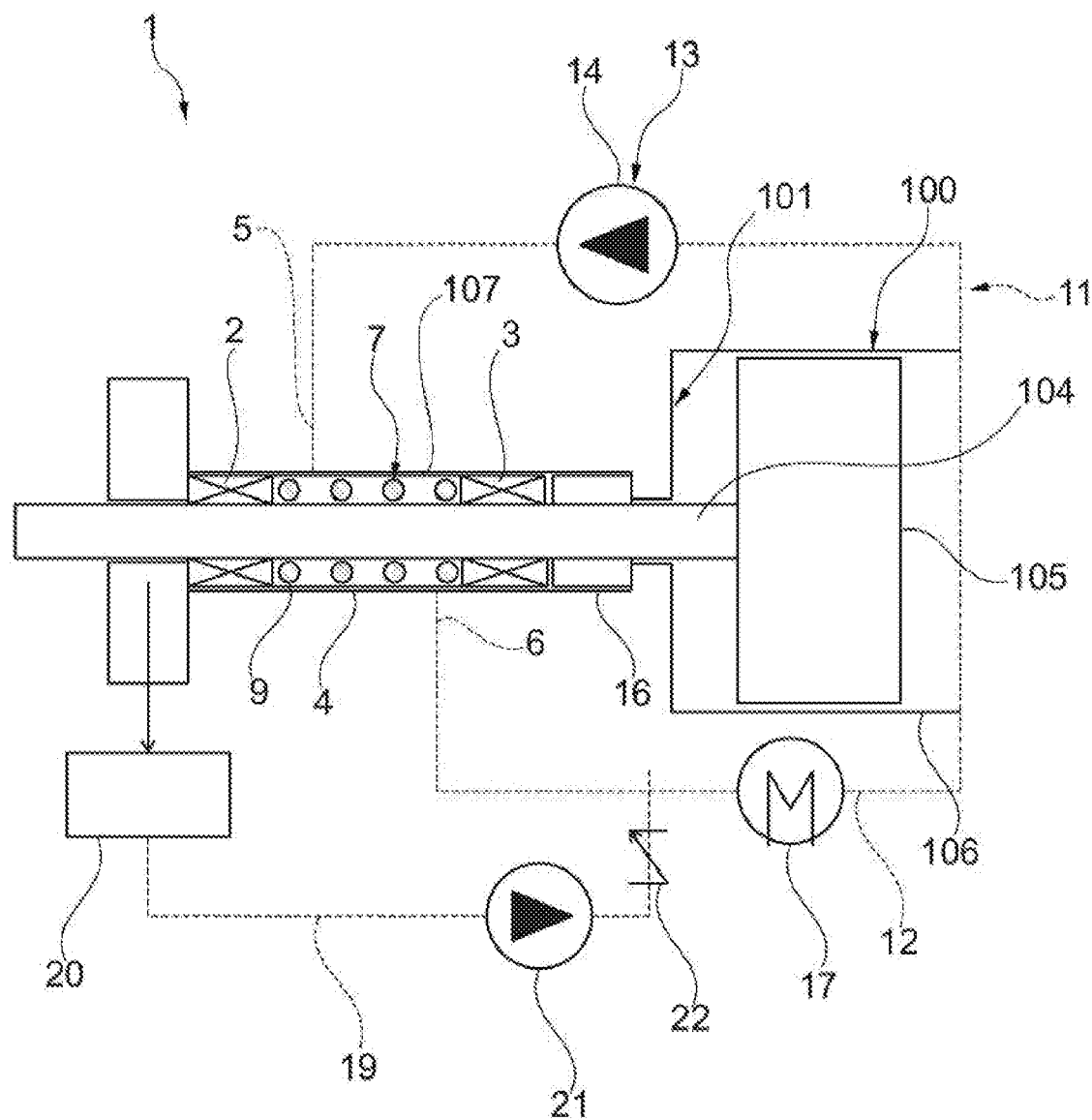
FIG. 4 is a schematic sectional view of a third embodiment of a seal assembly for a piston rod.

In the embodiments shown in FIGS. 1 and 4, the backflow prevention device 13 comprises a pump 14 placed on the return line 12 to move the barrier fluid from the outlet 6 to the inlet 5 of the chamber 4.

Figure 3:
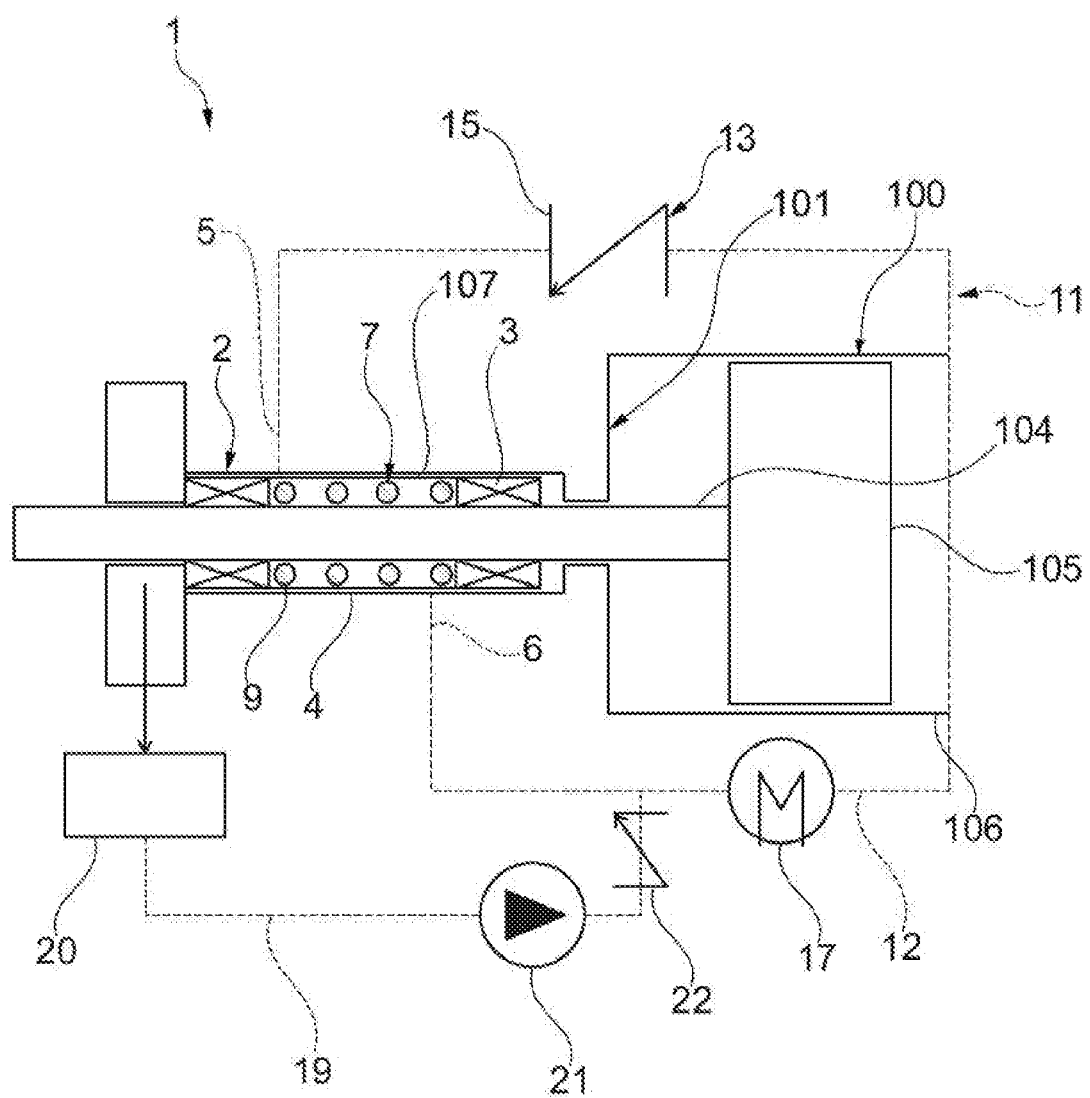
FIG. 3 is a schematic sectional view of a second embodiment of a seal assembly for a piston rod.

In the embodiment of FIG. 3, the backflow prevention device 12 comprises a check valve 15 placed on the return line 12 and configured to allow the barrier fluid to flow along the return line 12 from the outlet 6 to the inlet 5 of the chamber 4. Therefore, in this case, the pressure necessary to ensure the circulation of the barrier fluid is supplied by the forward stroke of the piston assembly 100, which creates a small pressure gradient inside the chamber 4.

A pressurizer device 7 is configured to provide the chamber 4 with a positive pressure with respect to the process environment "P". In particular, as shown in FIGS. 1, 2, 3 and 4, the pressurizer 7 is configured to be installed coaxially with the piston rod 104. The pressurizer 7 provides a positive pressure difference between the chamber 4 and the process environment "P". In other words, during normal operation the pressure of the barrier fluid inside the chamber 4 is higher than the pressure of the process fluid inside the cylinder 106 during both forward stroke and backward stroke of the piston assembly 100, so as to prevent any leak of process fluid toward the chamber 4. It is to be noted that the pressure inside the chamber 4 is not constant, but rather the pressurizer 7 maintains a constant pressure difference between the barrier fluid in the chamber 4 and the process fluid in the process environment "P", in particular inside the cylinder 106.

Figure 2:
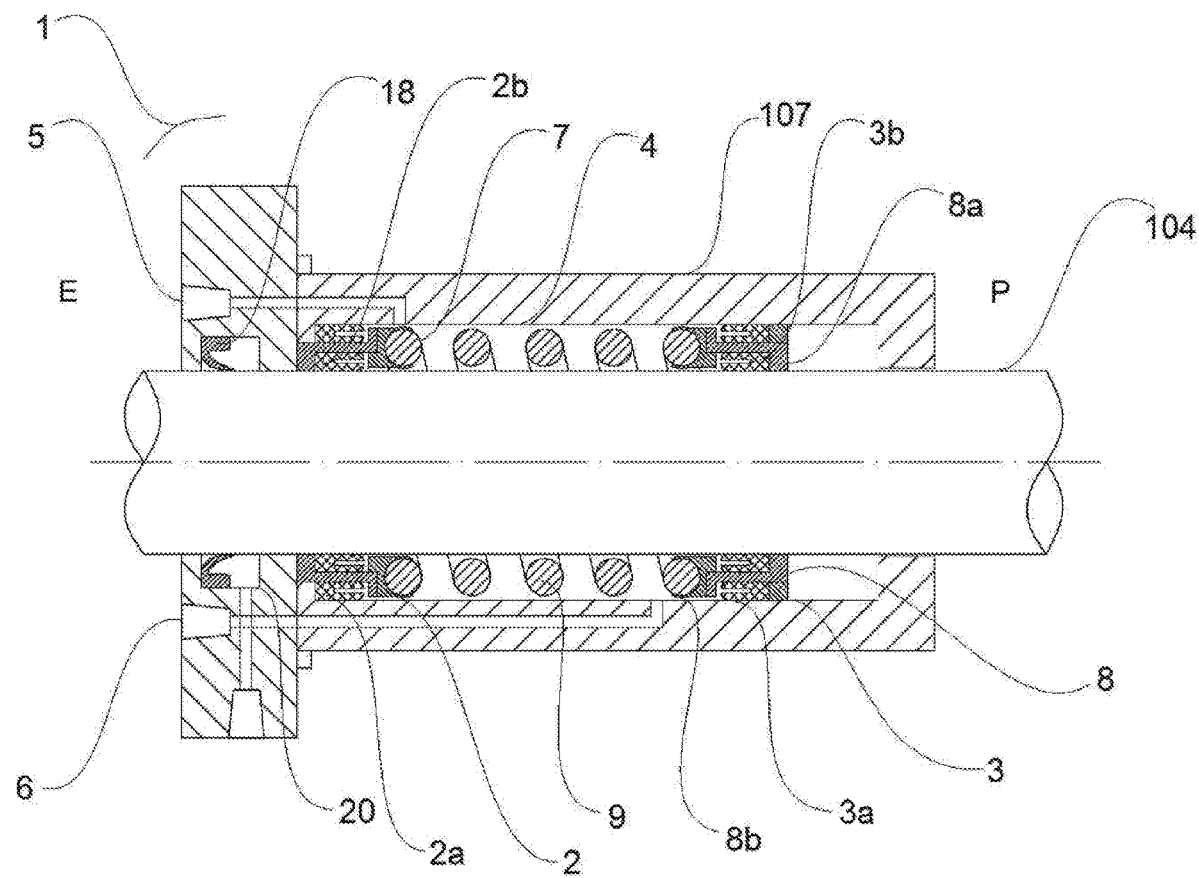
FIG. 2 is a perspective sectional view of a detail of the seal assembly of FIG. 1.

With additional detail and with reference to enclosed FIG. 2, the pressurizer 7 comprises a seal piston 8. The seal piston 8 has the purpose of applying an additional force to the barrier fluid in order to keep it at a high enough pressure. In particular, the seal piston 8 has a process surface 8a configured to face the process environment "P". The seal piston 8 has an internal surface 8b, which is configured to contact the barrier fluid inside the chamber 4.

According to the embodiments shown in FIGS. 1, 2, 3 and 4, the seal piston 8 at least partially defines the chamber 4. Therefore, in this case the internal surface 8b of the seal piston 8 also partially defines the chamber 4. Accordingly, the internal seal 3 comprises a first internal seal 3a, placed between the seal piston 8 and said container 107, and a second internal seal 3b between the seal piston 8 and said rod 104. The external seal 2, in turn, comprises a first external seal 2a, placed between the seal piston 8 and said container 107, and a second external seal 2b between the seal piston 8 and said rod 104.

In an embodiment said first internal seal 3a, said second internal seal 3b, said first external seal 2a and said second external seal 2b can be made in two halves in order to make it easier their maintenance and substitution, without requiring the complete disassembly of the system.

In further detail, in an embodiment shown in FIGS. 1, 2, 3, and 4, the pressurizer 7 comprises a spring 9 acting on the seal piston 8. The spring 9 is configured to provide a force on the seal piston 8 which adds to the process pressure. Specifically, in the embodiments shown in the figures, the spring 9 is placed inside the chamber 4. In particular, the spring 9 is placed coaxially with respect to the rod 104. In these cases, the spring 9 applies its elastic force on the internal surface 8b of the seal piston 8. The spring 9 is also connected to the outward surface of the chamber 4 located on the external seal 2.

During operation, the spring 9 is preloaded when the chamber 4 is filled with barrier fluid. In other words, the inflow of barrier fluid inside the chamber 4 pushes the seal piston 8 toward the cylinder 106, thus pre-extending the spring 9. The result of this preload is the application of elastic force onto the seal piston 8 as explained above.

In further embodiments, not shown in the drawings, the spring 9 is placed outside of the chamber 4, between the seal piston 8 and the cylinder 106. In this case, the spring 9 is pre-compressed when the chamber 4 is filled with barrier fluid.

Further, as shown in FIG. 4, the assembly 1 can comprise one or more pressure breaker 16 may be placed between the internal seal 3 and the cylinder 106. Said pressure breaker 16 may be implemented with a gas buffer chamber or with any other device known in the art and adapted to slow the flow of gas back down the rod on the intake stroke. The addition of said pressure breaker 16 may broaden the pressure range in which the assembly 1 can be employed.

The above description of exemplary embodiments refers to the accompanying drawings. The same reference numbers in different drawings identify the same or similar elements. Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. The above detailed description does not limit the scope of the claimed invention. Instead, the scope is defined by the appended claims.

The invention claimed is:

1. A seal assembly for a piston rod, the seal assembly comprising:
   a container configured to receive therethrough a piston rod extending from a cylinder having a process fluid therein;
   an external seal adapted to be placed inside said container and on the piston rod facing an external environment;
   an internal seal adapted to be placed inside said container and on the piston rod facing the cylinder, wherein the container, the external seal and the internal seal define in cooperation with each other a chamber within the container for the containment of barrier fluid, the chamber having a variable volume, wherein the chamber has an inlet for the intake of barrier fluid and an outlet for the exit of barrier fluid, and the chamber, inlet and outlet are located between the external seal and the internal seal;
   a recirculation circuit for the barrier fluid, the recirculation circuit being placed in fluid communication with the inlet and the outlet for recirculating the barrier fluid from the outlet back to the inlet; and
   a pressurizer device configured to maintain a positive pressure difference between the pressure of the barrier fluid in the chamber and a pressure of the process fluid in the cylinder,
   wherein the pressurizer device is configured to be installed coaxially with the piston rod.

2. The seal assembly according to claim 1, wherein the pressurizer comprises a seal piston at least partially defining the chamber, the seal piston having a process surface configured to face the cylinder and an internal surface configured to contact the barrier fluid, the internal seal being placed onto the seal piston.

3. The seal assembly according to claim 1, wherein the internal seal comprises a first internal seal, placed between the seal piston and said container, and a second internal seal between the seal piston and said piston rod and wherein the external seal comprises a first external seal, placed between the seal piston and said container, and a second external seal between the seal piston and said piston rod.

4. The seal assembly according to claim 1, wherein said first internal seal, said second internal seal, said first external seal and said second external seal are made in two halves in order to make it easier their maintenance and substitution.

5. The seal assembly according to claim 1, wherein the pressurizer comprises a spring acting on the seal piston and configured to provide a force on the seal piston which adds to the process pressure.

6. The seal assembly according to claim 1, wherein said spring is configured to provide a force applied on the internal surface of the seal piston.

7. The seal assembly according to claim 5, wherein the spring is configured to be extended by the inflow of barrier fluid inside the chamber.

8. The seal assembly according to claim 5, wherein the spring is placed outside of the chamber, between the seal piston and the cylinder.

9. The seal assembly according to claim 1, wherein the recirculation circuit comprises a return line in fluid communication with the inlet and the outlet.

10. The seal assembly according to claim 1, wherein said return line further comprises a heat exchanger adapted to cool the barrier fluid exiting the chamber.

11. The seal assembly according to claim 1, wherein the recirculation circuit comprises a backflow prevention device placed on the return line to prevent the barrier fluid to flow on the return line back from the inlet to the outlet of the chamber.

12. The seal assembly according to claim 1, wherein the backflow prevention device comprises a pump placed on the return line to move the barrier fluid from the outlet to the inlet of the chamber.

13. The seal assembly according to claim 11, wherein backflow prevention device comprises a check valve placed on the return line and configured to allow the barrier fluid to flow along the return line from the outlet to the inlet of the chamber.

14. The seal assembly according to claim 1, wherein said recirculation circuit also comprises a drain line, which is placed in fluid communication with the collector and with the return line.

15. The seal assembly according to claim 1, comprising one or more pressure breakers placed between the internal seal and the cylinder.

16. A piston assembly comprising a piston inserted in a cylinder; a piston rod attached to the piston; and a seal assembly according to claim 1, wherein the seal assembly is installed onto the piston rod.

17. The seal assembly according to claim 2, wherein the internal seal comprises a first internal seal, placed between the seal piston and said container, and a second internal seal between the seal piston and said piston rod and wherein the external seal comprises a first external seal, placed between the seal piston and said container, and a second external seal between the seal piston and said piston rod.

18. The seal assembly according to claim 2, wherein said first internal seal, said second internal seal, said first external seal and said second external seal are made in two halves in order to make it easier their maintenance and substitution.

19. The seal assembly according to claim 2, wherein the pressurizer comprises a spring acting on the seal piston and configured to provide a force on the seal piston which adds to the process pressure.

20. The seal assembly according to claim 2, wherein said spring is configured to provide a force applied on the internal surface of the seal piston.

* * * * *